(12) United States Patent
Nikitin et al.

(10) Patent No.: US 7,154,696 B2
(45) Date of Patent: Dec. 26, 2006

(54) TUNABLE FLY HEIGHT USING MAGNETOMECHANICAL EFFECT IN A MAGNETIC HEAD

(75) Inventors: Vladimir Nikitin, Campbell, CA (US); Savas Gider, San Jose, CA (US); Wen-chien Hsiao, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 325 days.

(21) Appl. No.: 10/777,522

(22) Filed: Feb. 11, 2004

(65) Prior Publication Data

US 2005/0264912 A1    Dec. 1, 2005

(51) Int. Cl.
G11B 5/60 (2006.01)
G11B 21/21 (2006.01)

(52) U.S. Cl. .................. 360/75; 360/294.7
(58) Field of Classification Search .......... 360/294.7
See application file for complete search history.

(56) References Cited

U.S. PATENT DOCUMENTS

| 3,706,861 A | * | 12/1972 | Giel ........................ 360/75 |
| 5,745,319 A | | 4/1998 | Takekado et al. |
| 5,991,113 A | | 11/1999 | Meyer et al. |
| 6,125,008 A | | 9/2000 | Berg et al. |
| 6,407,892 B1 | | 6/2002 | Shiroishi |
| 6,614,627 B1 | | 9/2003 | Shimizu et al. |
| 6,859,346 B1 | * | 2/2005 | Meyer ..................... 360/294.7 |
| 6,992,865 B1 | * | 1/2006 | Thurn et al. ............. 360/294.7 |
| 2001/0021078 A1 | | 9/2001 | Shiroishi |
| 2001/0046107 A1 | | 11/2001 | Irie et al. |
| 2005/0088784 A1 | * | 4/2005 | Macken et al. .......... 360/294.3 |

FOREIGN PATENT DOCUMENTS

JP   05151734 A   *   6/1993

* cited by examiner

*Primary Examiner*—Hoa T. Nguyen
*Assistant Examiner*—James L Habermehl
(74) *Attorney, Agent, or Firm*—Zilka-Kotab, PC

(57) ABSTRACT

A new structure for adjusting flying height using a magnetomechanical effect. A head includes a magnetomechanically active structure and a coil coupled to the magnetomechanically active structure, the magnetomechanically active structure responding to a magnetic field generated by the coil to expand and/or contract.

21 Claims, 12 Drawing Sheets

Easy Axis Initialized Parallel to the ABS

Easy Axis Initialized 45° to the ABS

TUNABLE FLY HEIGHT USING MAGNETOMECHANICAL EFFECT IN A MAGNETIC HEAD

FIELD OF THE INVENTION

The present invention relates to magnetic recording heads having controlled protrusion for tuning fly heights thereof, and more particularly, this invention relates to incorporation of a material having high magnetostriction into a magnetic head for providing controlled protrusion of the head.

BACKGROUND OF THE INVENTION

In a disk drive, a magnetic recording head is made of read and write elements. The write element is used to record and erase data bits arranged in circular tracks on the disk while the read element plays back a recorded magnetic signal. The magnetic recording head is mounted on a slider which is connected to a suspension arm, the suspension arm urging the slider toward a magnetic storage disk. When the disk is rotated the slider flies above the surface of the disk on a cushion of air which is generated by the rotating disk.

The read element is generally made of a small stripe of multilayer magnetic thin films which have either magnetoresistance (MR) effect or giant magnetoresistance (GMR) effect, namely which changes resistance in response to a magnetic field change such as magnetic flux incursions (bits) from magnetic storage disk. Recorded data can be read from a magnetic medium because the external magnetic field from the recorded medium (the signal field) causes a change in the direction of magnetization in the read element, which in turn causes a change in resistance in the read element and a corresponding change in the sensed current or voltage.

FIGS. 1 and 2 illustrate examples of a conventional composite type thin-film magnetic head 10. FIG. 1 is a cross-sectional view of the head 10 perpendicular to the plane of the air bearing surface (ABS). FIG. 2 shows the slider 11 flying above the disk 13.

In these figures, the reference numeral 12 denotes a substrate, 15 denotes an undercoating, 20 denotes a lower shield layer of the MR reproducing head part, 21 denotes an upper shield layer of the MR head part, which can also act as a lower pole of an inductive recording head part, 22 denotes a MR layer provided through an insulating layer 23 between the lower shield layer 20 and the upper shield layer 21, 26 denotes a write gap layer, 27 denotes a lower insulating layer deposited on the upper shield layer 21, 28 denotes a coil conductor formed on the lower insulating layer 27, 29 denotes an upper insulating layer deposited so as to cover the coil conductor 28, 30 denotes an upper pole, and 34 denotes a pad that would connect the read or write coil to other components in the drive. In general, there would be a plurality of pads 34 on the slider 11. Note that the pad 34 connects directly to the coil conductor 28. The upper pole 30 is magnetically connected with the lower pole (upper shield layer) 21 at its rear portion so as to constitute a magnetic yoke together with the lower pole 21.

As recording density and data transfer rate have increased over the past a few years, critical dimensions in the recording device such as track width read and write gap and coil size have decreased accordingly. Also, the fly height between the air bearing surface (ABS) 32 and the media have become smaller and smaller. For reference, recording heads with 40 GB/in$^2$ products typically have fly heights of about 12 nanometers. This fly height will continue to decrease in the future. This reduction in head critical dimensions and fly height, while beneficial to magnetic performance, also comes with cost on thermal and mechanic reliability.

There are several factors that limit the reduction in slider flying height. These factors might reasonably be ignored at flying heights of above 20 nanometers, but would become major concerns at flying heights on the order of <5 nanometers. These include variations in the sliders themselves, variations in the structure that supports the sliders, and media surface roughness.

Write- and temperature-induced protrusion causes variation in the fly height, typically requiring an increase in the magnetic spacing to prevent reliability issues of the head-to-disk interactions. The thermal expansion coefficients for the substrate and the various layers of the head differ, so when the head becomes heated with changes of the ambient HDD temperature, some layers will begin to protrude from the ABS. FIG. 2B depicts the head 10 when the write element is not operating. FIG. 2C is a detailed diagram of the heat transfer and protrusion profile of the head 10 when the head is active (e.g., when the write coil is energized). One issue with heads is that the write-induced protrusion of the pole and overcoat can cause head-media contact, resulting in errors and impacting reliability of the drive operation. In older generations of heads, this was not a problem because the head was flying much higher than the changes induced by write-induced protrusion. Ohmic heating from write current through the coil and eddy current in write pole/yoke and magnetic hysteresis of magnetic materials are confined in a tiny space near the ABS, which typically lead to unacceptable thermal protrusion and drive reliability concerns. As can be seen in FIG. 2C, the top write pole 30 and overcoat protrude from the ABS 32 toward the media 13. The protrusion amount is typically 1–6 nanometers.

Thermal effects also are exaggerated by minute slider flying heights. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials. Reduced flying heights increase the need to take thermal expansion and thermally induced elastic deformation into account.

Normal tolerances in slider fabrication lead to structural variations among the sliders in any given batch. Consequently, the flying heights of sliders in the batch are distributed over a range, although the flying height of each slider individually is substantially constant.

Variations in supporting structure occur primarily in the transducer support arm, the suspension or gimballing structure, slider geometry and load arm. These variations influence the flying height, and the nature of a given slider's reaction to any disturbances, e.g. due to shock or vibration.

Disk roughness also becomes more of a problem at lower slider flying heights. With maximum peaks more likely to protrude into a normal range of slider operation, the probability of unintended and damaging slider/disk contact increases. The risk of damage from these discontinuities is even greater at lower slider flying heights.

Hard disk drives have to operate also at different altitudes. Changes in atmospheric pressure due to altitude variations induce changes of the flying height of the sliders, typically decreasing at higher altitude. To avoid head-disk contact, the ABS's are designed to fly slightly higher at normal altitudes to accommodate changes at higher altitudes.

One proposed design of a slider would drag on the disk surface, thereby more precisely fixing a head/disk spacing based on a peak roughness of the disk surface. Any improvement in setting the transducer/recording surface gap, however, would be at the cost of excessive wear to the slider, media recording surface, or both.

Another proposed design uses a heater inside the head structure to induce thermal protrusion, as described in U.S. Pat. No. 5,991,113 to Meyer et al. By adjusting the current into the heater, a controlled increase in the head temperature can be obtained, resulting in the protrusion of the head elements towards the disk, thereby controlling the magnetic spacing. There are many disadvantages of this design. First, the temperature of the read element is increased, thereby effecting its reliability and maximum allowable bias current. In order to provide a sufficient protrusion adjustment, significant heat must be applied to the head. This results in heating of the sensor as well, which ultimately leads to deterioration of the sensor materials. Further, because the sensor materials are heated, their conductivity is reduced, resulting in less current being able to pass through the sensor, and consequently, less signal. Second, the thermal response is slow (~200 microseconds (μsec)), limiting applications of this design to a slow adjustment of the flying height. To compensate for various change in magnetic spacing it is desirable to have a fast adjustment of protrusion to obtain the optimal signal. Thus, the protrusion needs to be precisely timed. Third, this design requires relatively high power consumption (>25 mW) in order to produce adequate fly height adjustments. This is undesirable in computing environments requiring battery power, such as in laptop computers. Fourth, the head elements can only be brought closer to the disk; magnetic spacing cannot be increased.

What is therefore needed is a structure providing controllable protrusion while avoiding the aforementioned disadvantages.

SUMMARY OF THE INVENTION

The present invention provides a new structure for adjusting flying height using a magnetomechanical effect. In one embodiment, a head includes a magnetomechanically active structure and a coil coupled to the magnetomechanically active structure, the magnetomechanically active structure responding to a magnetic field generated by the coil to expand and/or contract.

The magnetomechanically active structure is preferably a toroid shape, but can be formed of two or more layers of high magnetostrictive materials, etc.

In one embodiment, a magnetization of the magnetomechanically active structure is set parallel to the ABS, the magnetomechanically active structure inducing protrusion of the head into the ABS in response to the magnetic field generated by the coil. In another embodiment, a magnetization of the magnetomechanically active structure is preset at an angle between about 0 and about 90 degrees with respect to the ABS, the magnetomechanically active structure inducing protrusion of the head towards the ABS in response to the magnetic field generated by the coil when current is passed through the coil in a first direction, the magnetomechanically active structure inducing contraction of the head away from the ABS in response to the magnetic field generated by the coil when current is passed through the coil in a second direction opposite the first direction. For example, the magnetization of the magnetomechanically active structure can be initialized at an angle between about 30 and about 60 degrees with respect to the ABS.

Preferably, a portion of the magnetomechanically active structure positioned away from the ABS is anchored for causing more protrusion towards the ABS. In such an embodiment, a first material for anchoring the portion of the magnetomechanically active structure is positioned away from the ABS, and a second material is coupled to the magnetomechanically active structure towards (or away from) the ABS, the second material having a lower Young's modulus than the first material. A third material can be positioned between the magnetomechanically active structure and the second material, the third material having a coefficient of thermal expansion similar to that of the second material to create a general matching of the coefficients of thermal expansion of the materials surrounding the magnetomechanically active structure.

A layer of material may also be positioned on an opposite side of, i.e., behind, at least one of a read element and a write element with respect to the ABS, the layer of material having a Young's modulus lower than a majority of materials surrounding the layer of material. This allows the magnetomechanically active structure to more easily carry the read and/or write element into or away from the ABS. Second and third layers of material extending from the layer of material towards the ABS, the second and third layers of material having a Young's modulus lower than a majority of materials surrounding the second and third layers of material.

The magnetomechanically active structure can be positioned at any desired location in the head or sliders, such as between a read element and a write element of the head, on an opposite side of a read element of the head with respect to a write element of the head, on an opposite side of a write element of the head with respect to a read element of the head, etc. Likewise, the magnetomechanically active structure can be used in conjunction with any type of head, including merged and "piggyback" head designs, perpendicular recording systems, tape heads, etc.

One benefit provided by the magnetomechanically active structure is that it can contract upon detection of a thermal asperity on the disk surface so that the head avoids contact with the asperity.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings where like numerals represent like portions of the structures shown in the various drawings.

Prior Art

Prior Art

Prior Art

Prior Art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
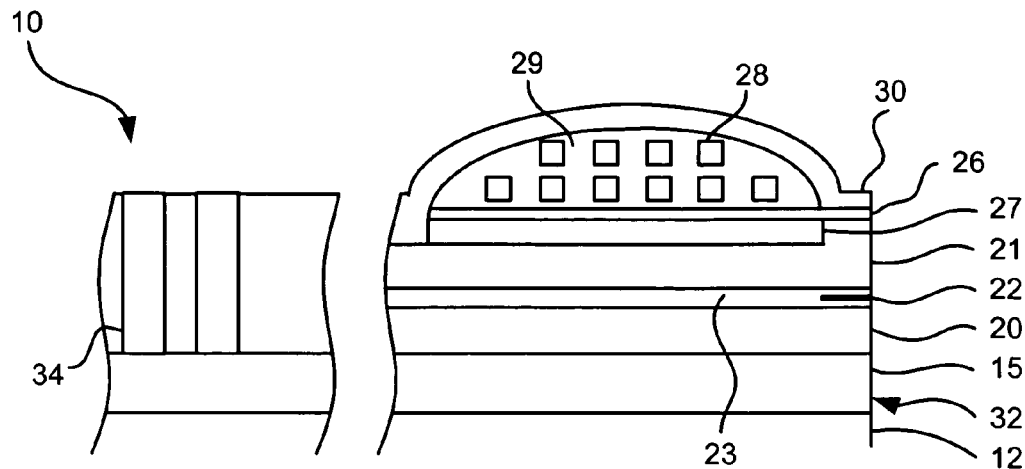
FIG. 1 is a cross-sectional view of a conventional composite type magnetic head, perpendicular to the plane of the ABS.
Figure 2A:
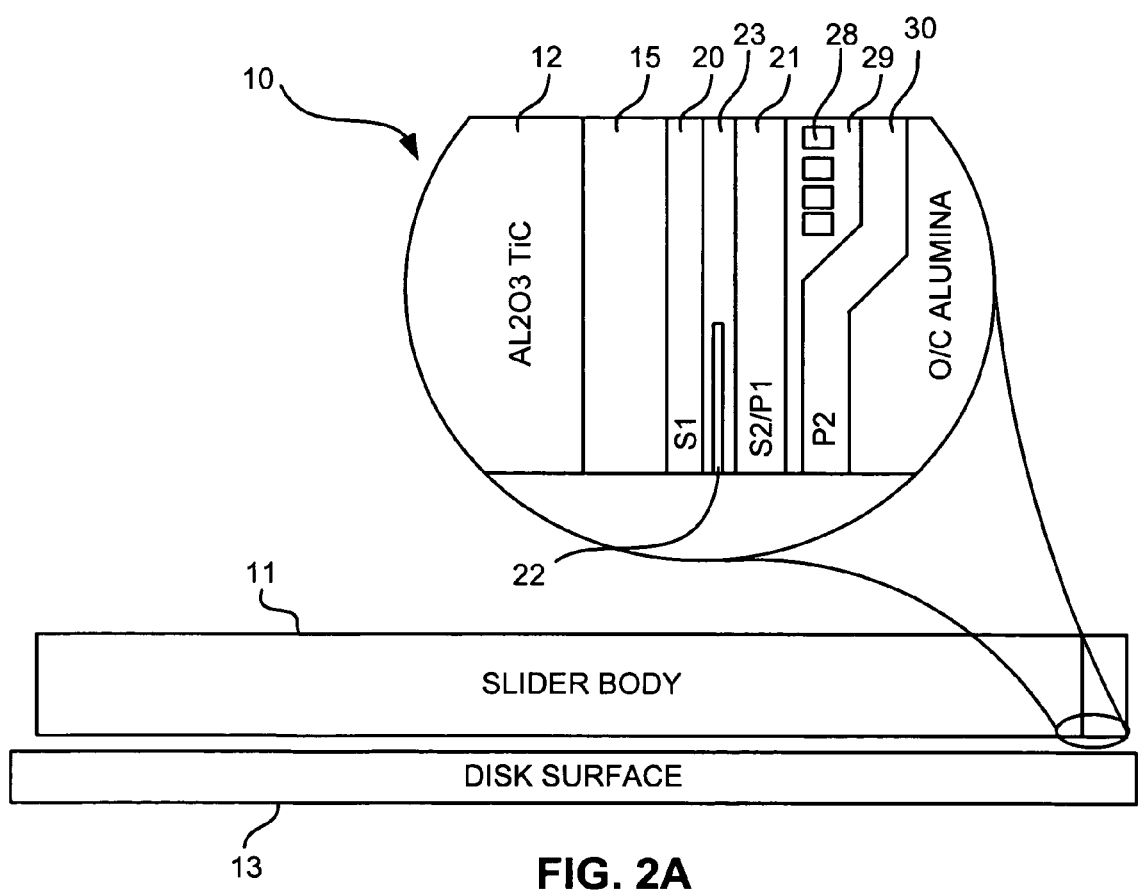
FIG. 2A shows a cold slider flying above the disk.
Figure 2B:
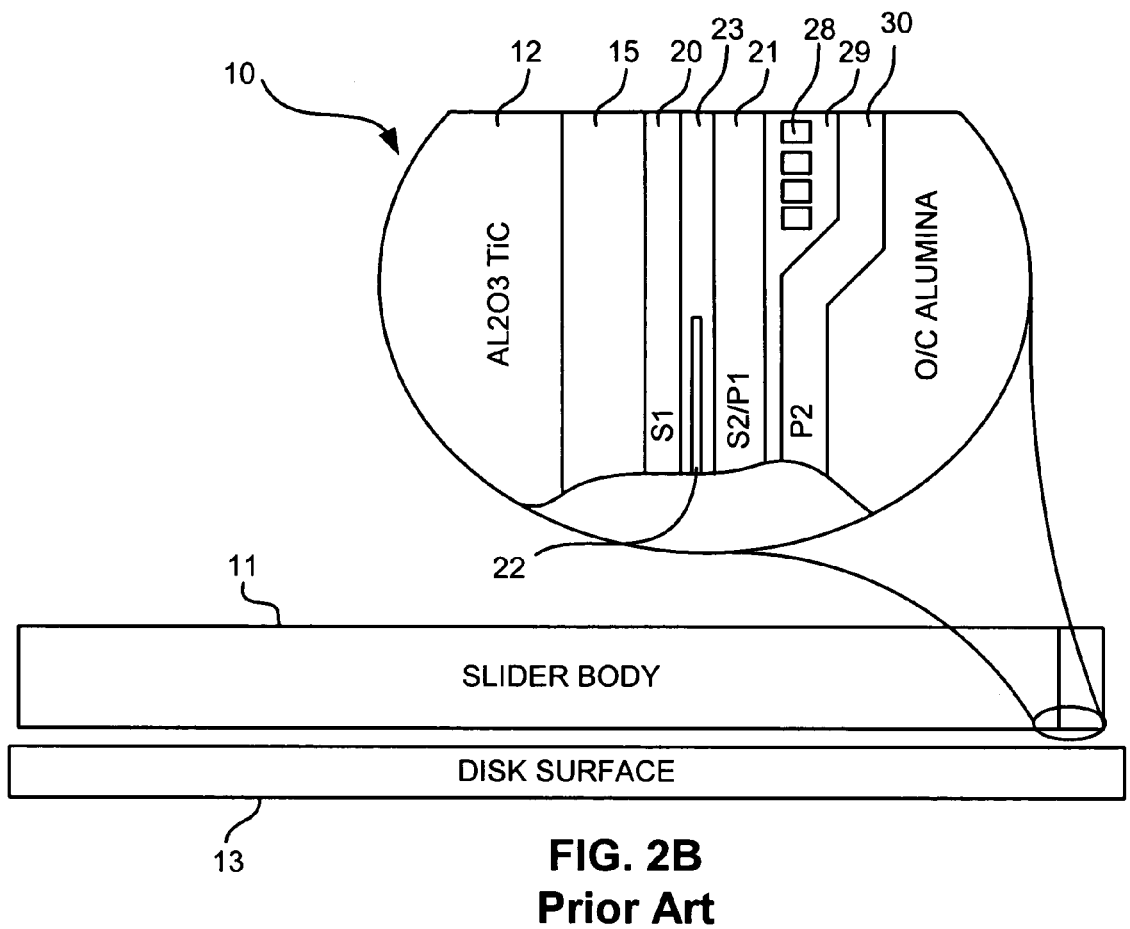
FIG. 2B depicts the discontinuity of a head caused by recession of various materials and structure due to the ABS fabrication process.
Figure 2C:
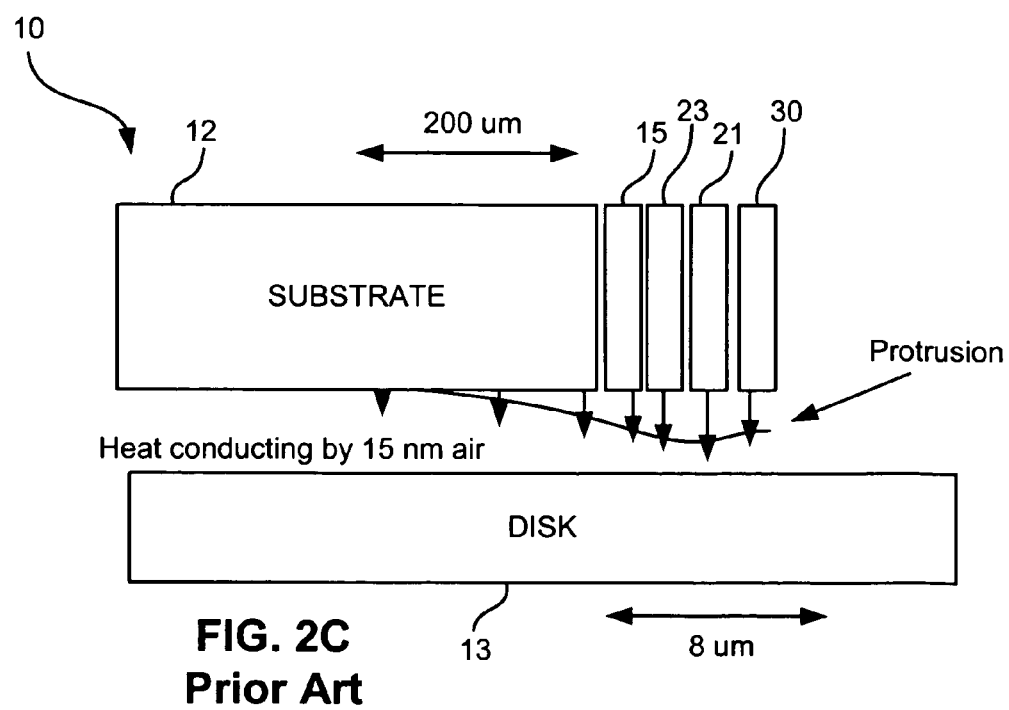
FIG. 2C is a detailed diagram of the heat transfer profile and protrusion profile of a head.
Figure 3:
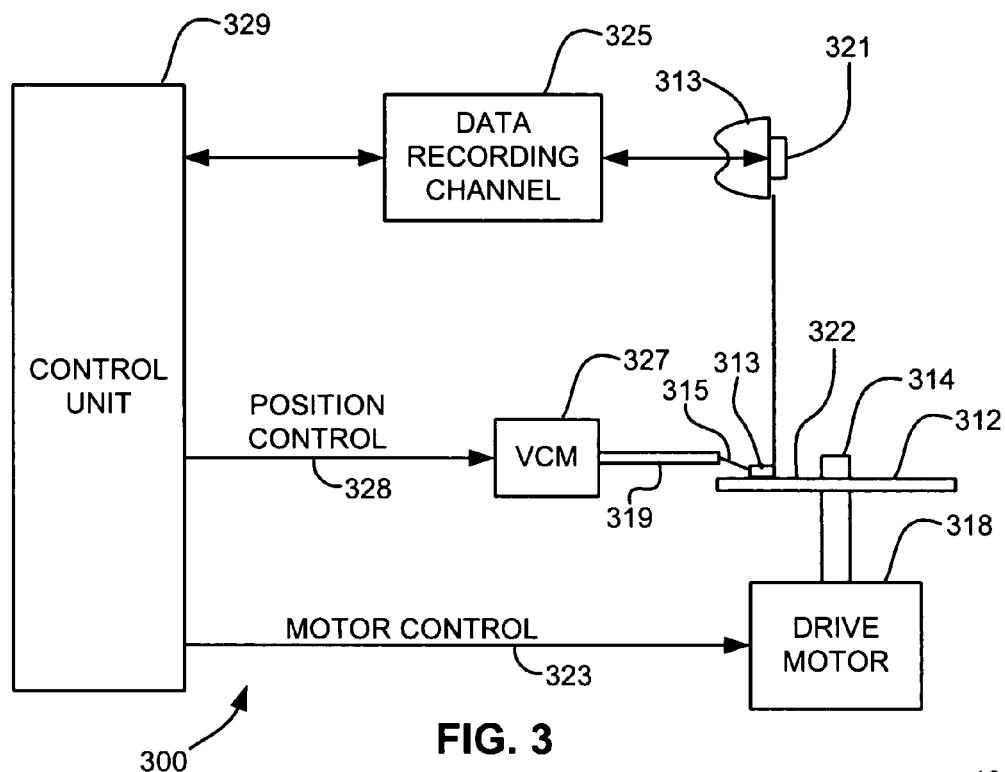
FIG. 3 is a simplified system diagram of a magnetic disk drive system in accordance with one embodiment.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

Figure 4:
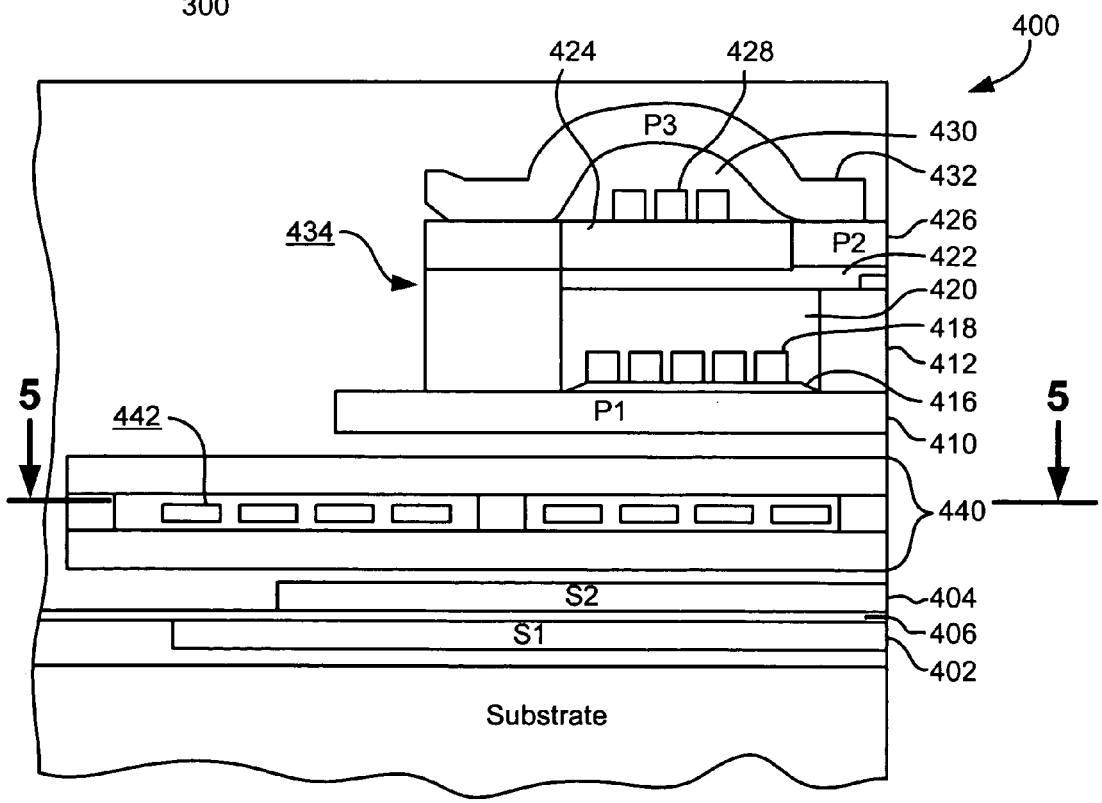
FIG. 4 is a partial cross sectional view of a head according to one embodiment.

FIG. 4 illustrates a partial cross section of a head 400 according to one embodiment. The head 400 shown in FIG. 4 and the examples below are formed by conventional processes and of conventional materials unless otherwise indicated. In FIG. 4, the reference numeral 402 denotes a lower shield layer (S1) of the MR reproducing head part, 404 denotes an upper shield layer (S2) of the MR head part, 406 denotes a MR layer provided through an insulating layer between the lower shield layer 402 and the upper shield layer 404, 410 denotes a lower pole (P1) of an inductive recording head part, 412 denotes a P1 pole tip (P1P), 416 denotes a lower insulating layer deposited on the lower pole 410, 418 denotes a first coil conductor formed on the lower insulating layer 416, 420 denotes a first insulating layer deposited so as to cover the first coil conductor 418, 422 denotes a recording gap layer, 424 denotes an upper spacing layer positioned between above the recording gap layer 422, 426 denotes a second pole (P2), 428 denotes a second coil conductor formed on the upper insulating layer 424, 430 denotes a second insulating layer deposited so as to cover the second coil conductor 428, and 432 denotes an upper pole (P3). The upper pole 432 is magnetically connected with the lower pole 410 by a back gap 434 so as to constitute a magnetic yoke together with the lower pole 410. Note that P2 426 and P3 432 may be a continuous structure, and additional layers may be added, etc.

Figure 5:
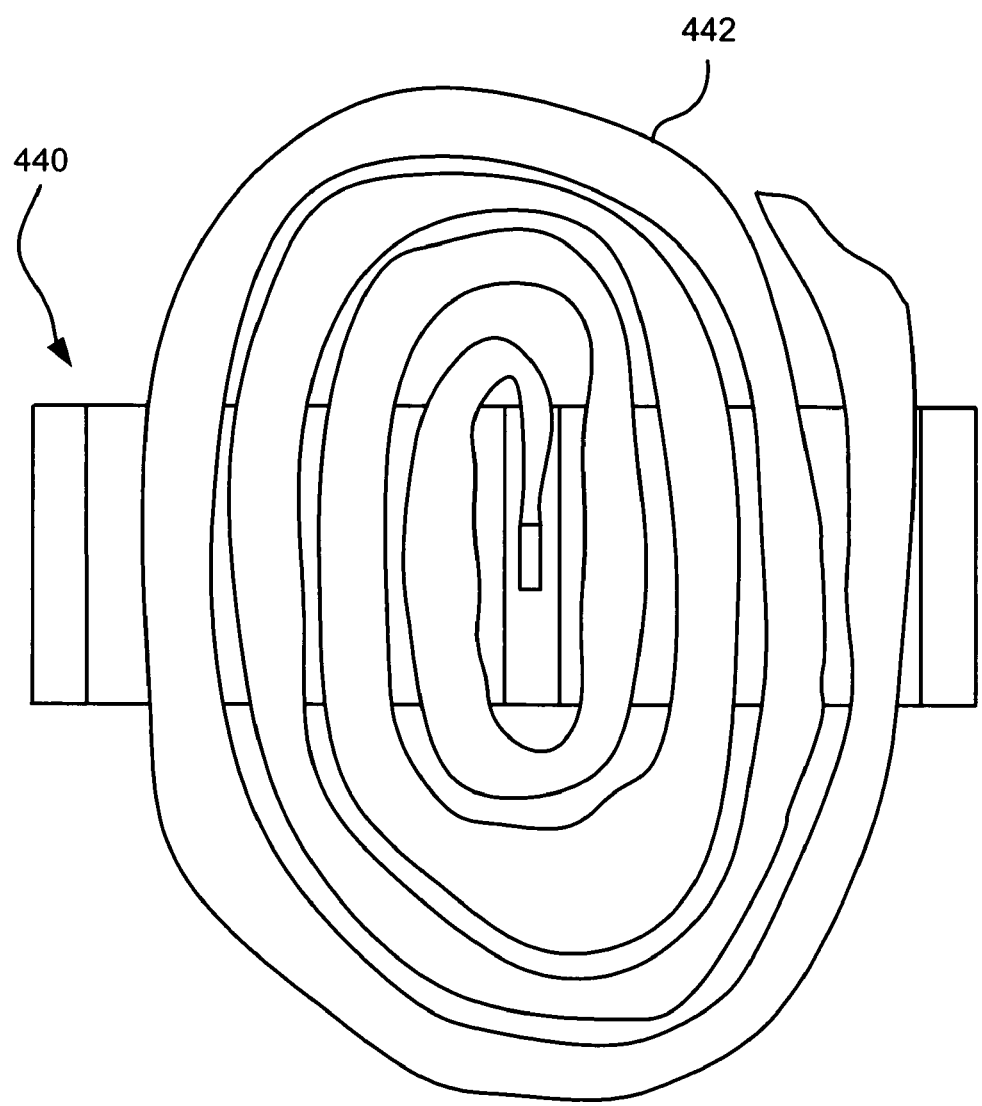
FIG. 5 is a partial cross sectional view of the toroid and coil of FIG. 4 taken along line 5—5 of FIG. 4.

A magnetomechanically active structure 440 is positioned in the head 400. The magnetomechanically active structure 440 allows tuning of the flying height of the ABS of the head above the magnetic media using a magnetomechanical effect that is described in detail below. In this embodiment, a toroid structure 440 ("toroid") comprising magnetic material with high magnetostriction, and a coil 442, are incorporated into the head. FIG. 5 is a top view of the structure of FIG. 4 illustrating the coils 442 of the toroid 440.

For ease of understanding, the remaining discussion shall refer to a toroid as the magnetomechanically active structure 440, it being understood that other types of magnetomechanically active structures may also be implemented. For example, while a toroid-like structure is preferred, individual layer(s) of high magnetostrictive materials can also be used with one or both ends being free of high magnetostrictive materials. Also, the toroid can be divided into separate parts, etc.

By applying a small current to the coil 442 inside the toroid 440, the magnetization of the toroid 440 is varied resulting in a controlled deformation due to the magnetomechanical effect. Elongation in the toroid 440 leads to protrusion of the head elements towards the disk. Contraction of the toroid 440 leads to retraction of the head elements away from the disk. By controlling the elongation and contraction of the toroid 440, the magnetic spacing of the head with respect to the media can be controlled.

The main advantages of this approach are:
- fast response in adjusting flying height (magnetization changes can be as fast as few nanoseconds);
- low power consumption (a few mA of current are sufficient to fully saturate the toroid, corresponding to a maximum deformation);
- negligible increase in the sensor temperature (since mechanical deformation is induced using magnetostriction only, not the temperature gradient);
- can achieve uniform or selective protrusion of read and write elements by choosing placement of the toroid;
- consistent fly height can be achieved for different heads;
- minimal effect on reading and writing as toroid is a closed structure; and
- allows avoidance of thermal asperities on the disk surface.

Figure 6:
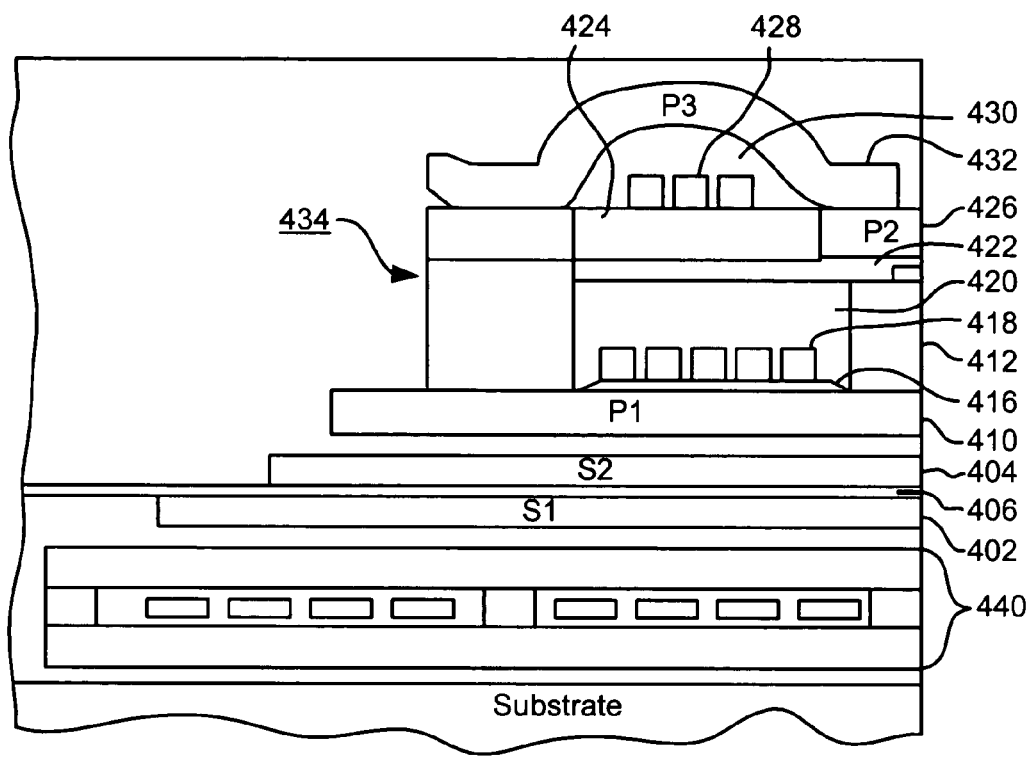
FIG. 6 is a partial cross sectional view of a head in which the toroid is positioned below the read element.
Figure 7:
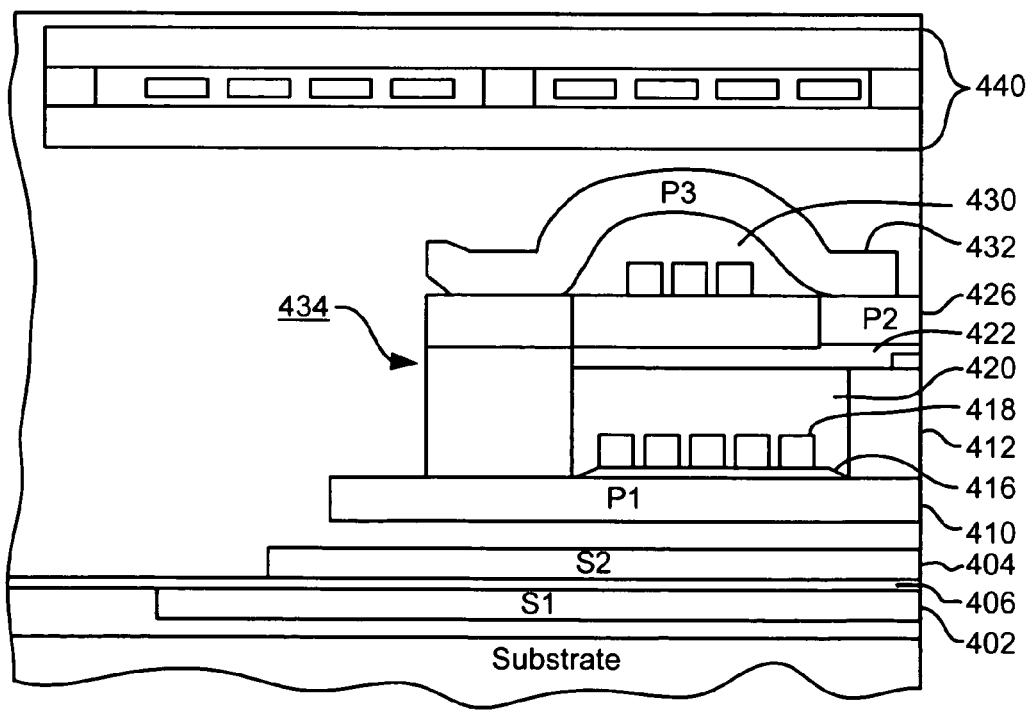
FIG. 7 is a partial cross sectional view of a head in which the toroid is positioned above the write element.
Figure 8:
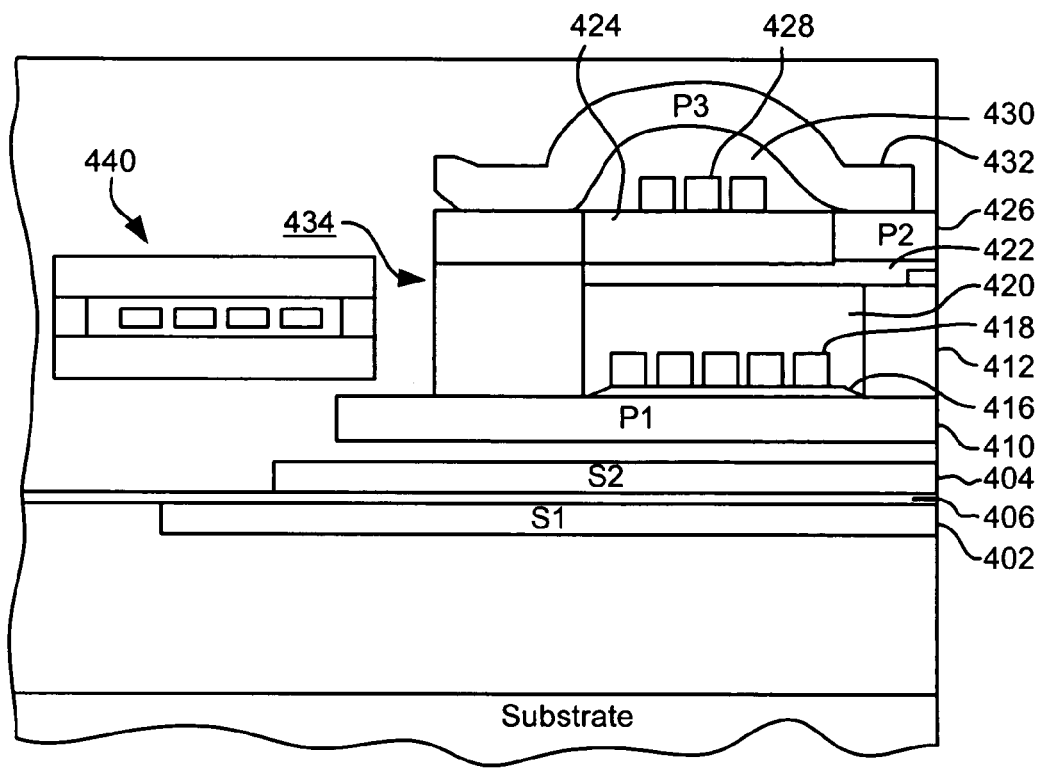
FIG. 8 is a partial cross sectional view of a head in which the toroid is positioned behind the write element.

The toroid 440 can be placed in a variety of locations, such as below the reader as shown in FIG. 6, between the reader and writer as shown in FIG. 4, above the write head as shown in FIG. 7, behind the reader and writer as shown in FIG. 8, etc. The toroid 440 may or may not be exposed to the ABS.

The toroid can be built into the head using conventional processing steps, practically identical to the processes used to form the write head yoke. The preferred material for the toroid is a material with high magnetostriction (lambda). Alloys such as CoFe with a 50/50 or 40/60 Co—Fe composition are well suited for this purpose, since they have high magnetostriction value of $40 \times 10^{-6}$ to $50 \times 10^{-6}$ and they can be electro-plated. The magnetization easy axis can be set parallel to the ABS surface or at an angle thereto by field-plating and optional post-plating annealing in the magnetic field.

Desirable properties of the material used to construct the toroid are:
- high magnetostriction to provide maximum protrusion and expansion;
- high magnetic permeability which requires lower current through the coils for switching;
- well-defined magnetic anisotropy;
- high Young's modulus;
- low coercivity which reduces hysteresis losses; and
- low coefficient of thermal expansion (CTE).

The suitable materials for toroid formation include (but are not limited to) CoFe, Terfanol [ref], TbFe/FeB multilayers [ref], and TbFe/CoFe multilayers [ref]. The actual material selected will, of course, depend on the desired properties of the particular design.

Figure 9:
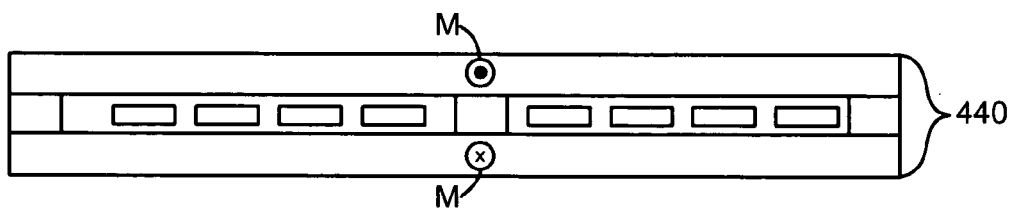
FIG. 9 is a partial cross sectional view of the magnetization of the toroid prior to energization of the coils.
Figure 10:
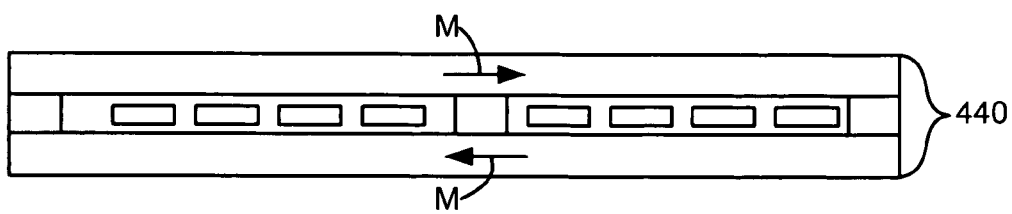
FIG. 10 is a partial cross sectional view of the magnetization of the toroid upon energization of the coils.

Control of the flying height is implemented as follows. The material forming the toroid is annealed at some temperature to set the easy axis (M). As shown in FIG. 9, M is set to point parallel to the ABS (out of the plane of the paper). In the absence of the current in the toroid 440, its magnetization is parallel to the ABS (out of the picture plane), as set by magnetic anisotropy. As shown in FIG. 10, as current is applied to the toroid coils 442, the magnetization M rotates towards the ABS surface. Due to magnetostriction of the toroid material, the toroid 440 elongates in the direction perpendicular to the ABS surface, as approximately described by the following equation:

$$\Delta L = L \cdot 3/2 \cdot \lambda \cdot (1 - \cos^2 \phi) \qquad \text{Equation 1}$$

where $\Delta L$ is the strain on the toroid, L is the length of the toroid, $\lambda$ is the magnetostriction of the toroid material, and $\phi$ is the angle of magnetization with respect to the direction of magnetization normal to the ABS.

Following Equation 1, it can be seen that the direction of magnetization does not matter for the magnetostriction as the change in strain on the toroid, and consequently the extent of protrusion, is dependent upon the square of the angle of magnetization.

Figure 11:
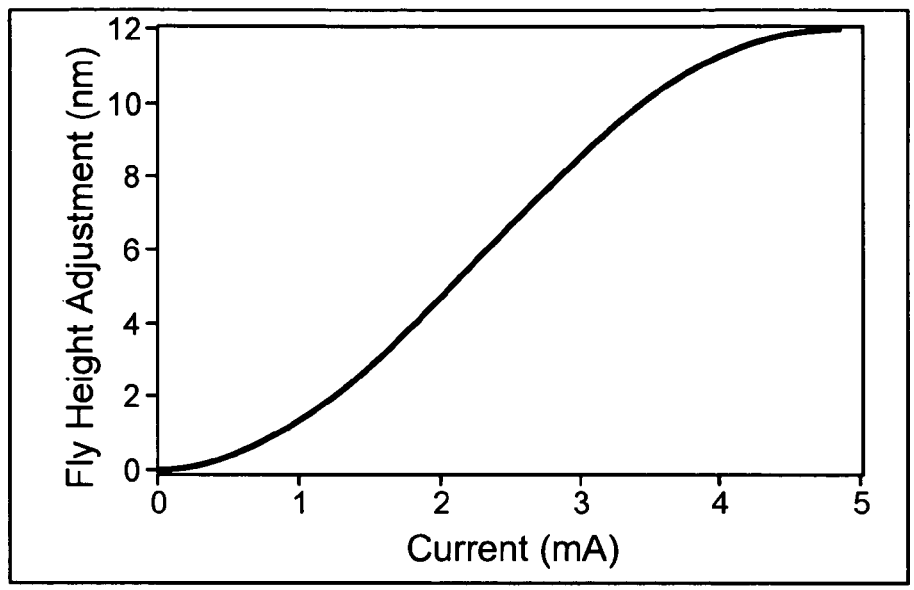
FIG. 11 is a chart depicting the effect of coil-induced protrusion when the easy axis of the toroid is initialized parallel to the ABS.

FIG. 11 graphically depicts the effect of coil-induced protrusion when the easy axis of the toroid is initialized parallel to the ABS. As current is applied to alter the magnetization of the toroid, a magnetomechanical effect on the materials of the toroid occurs, causing them to expand.

Figure 12:
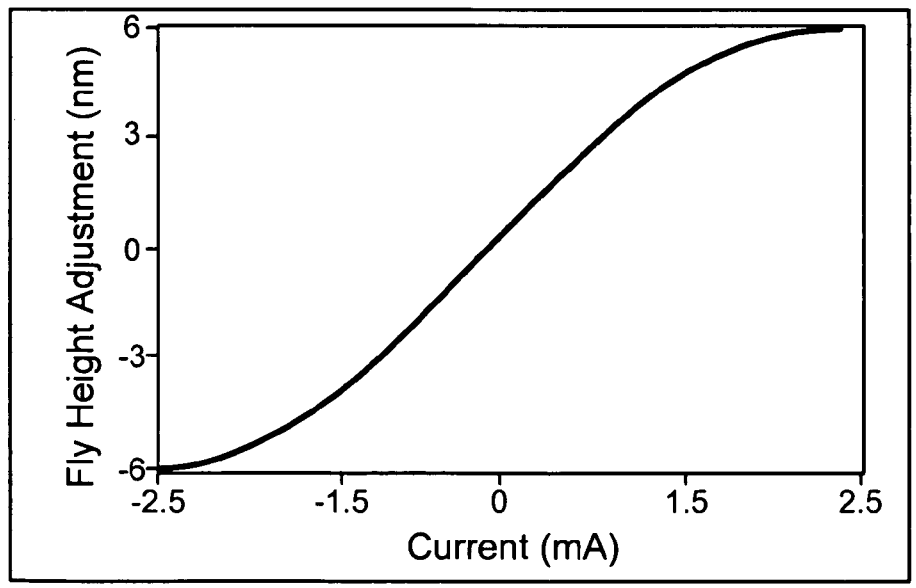
FIG. 12 is a chart depicting the effect coil-induced protrusion when the easy axis of the toroid is initialized at 45° to the ABS.

FIG. 12 graphically depicts the effect coil-induced protrusion when the easy axis of the toroid is initialized at 45° to the ABS. If the easy axis is set at a 45° angle, then the magnetization can be switched perpendicular to the ABS to induce expansion by passing current through the coil in a first direction, and parallel to the ABS to induce contraction by passing current through the coil in the opposite direction. This provides an advantage over thermal fly height control, which can only induce protrusion.

Note that a designer can set the easy axis to any angle between parallel (0°) and perpendicular (90°) to the ABS to shift the expansion to contraction ratio as desired.

In either case, an advantage is that the expansion or protrusion is nonlinear at the edges but linear towards the middle. Thus, a sophisticated circuit is not needed to control protrusion or contraction.

Since by varying the current into the coils one can precisely control magnetization, deformation of the toroid can be tuned to the desired level. The mechanical deformation in the toroid causes strain in the head elements, moving them closer to the disk.

This structure provides more than adequate range of spacing control. For example, a 200 µm long CoFe toroid ($\lambda = 60 \times 10^{-6}$) has a range of protrusion from 0 to 12 nm, and scales with the toroid length. Due to low magnetic reluctance of the toroid, only small currents into the toroid coil are needed to fully rotate its magnetization, and, depending on the number of coil turns, are as small as 1–100 mA.

In many cases, it is desirable to maximize the protrusion induced by the toroid. Because the head structure is fairly rigid, when the coil in the toroid is energized, the toroid expands both towards and away from the ABS. To improve the expansive properties of the toroid, the back of the toroid (away from the ABS) can be anchored to force most of the protrusion towards the ABS. This can result in nearly doubling the inducible protrusion.

To anchor the back of the toroid, a high Young's modulus material can be placed towards the back of the toroid. Typical head materials such as Al2O3, Si3N4, etc. are suitable for this purpose. In the front of the toroid (towards the ABS), a layer or layers of low Young's modulus material (or a void) is created to reduce resistance to protrusion by nonoperative portions of the head.

Figure 13:
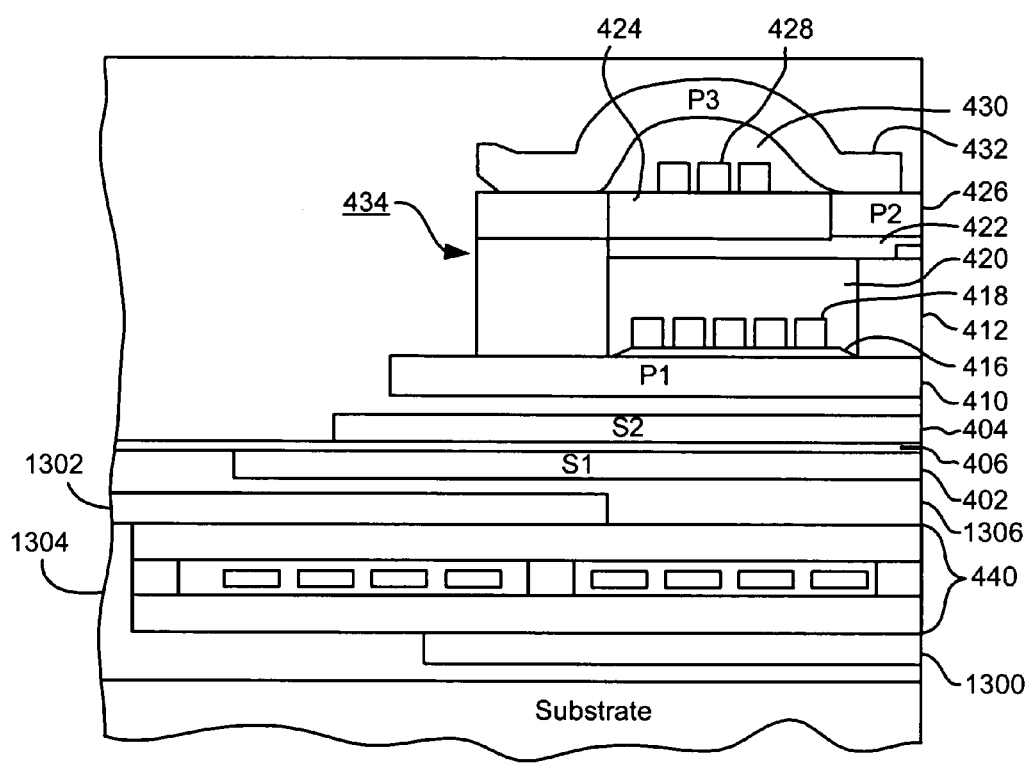
FIG. 13 is a partial cross sectional view of a head in which layers of low Young's modulus material are positioned about the toroid.

FIG. 13 depicts a variation of the head shown in FIG. 6 (with the toroid 440 positioned below the reader and writer). As shown, a layer 1300 of low Young's modulus material (or void) is positioned below the front of the toroid 440 and extends to about the ABS. This reduces the nonexpansive effect on the front of the toroid 440 from the substrate. The rear of the toroid 440 abuts a material 1302 having a higher Young's modulus, which causes protrusion of the toroid 440 to extend towards the ABS.

A second layer 1304 of low Young's modulus material (or void) is positioned above the back of the toroid 440, but does not extend to the ABS but that can extend about to the back end of the slider. The front of the toroid 440 is coupled to the writer and reader portions of the head by a layer 1306 of higher Young's modulus material. This in turn causes the front of the toroid 440 to carry the reader and writer into the ABS. Illustrative materials having a low Young's modulus include baked photoresist, resins, etc., preferably in which the amount of displacement does not increase in the amount of the force resisting expansion or contraction of the toroid 440. In the embodiment shown in FIG. 13, the layers 1300, 1304 of low Young's modulus material are baked photoresist having a thickness of about 0.5 µm.

Figure 14:
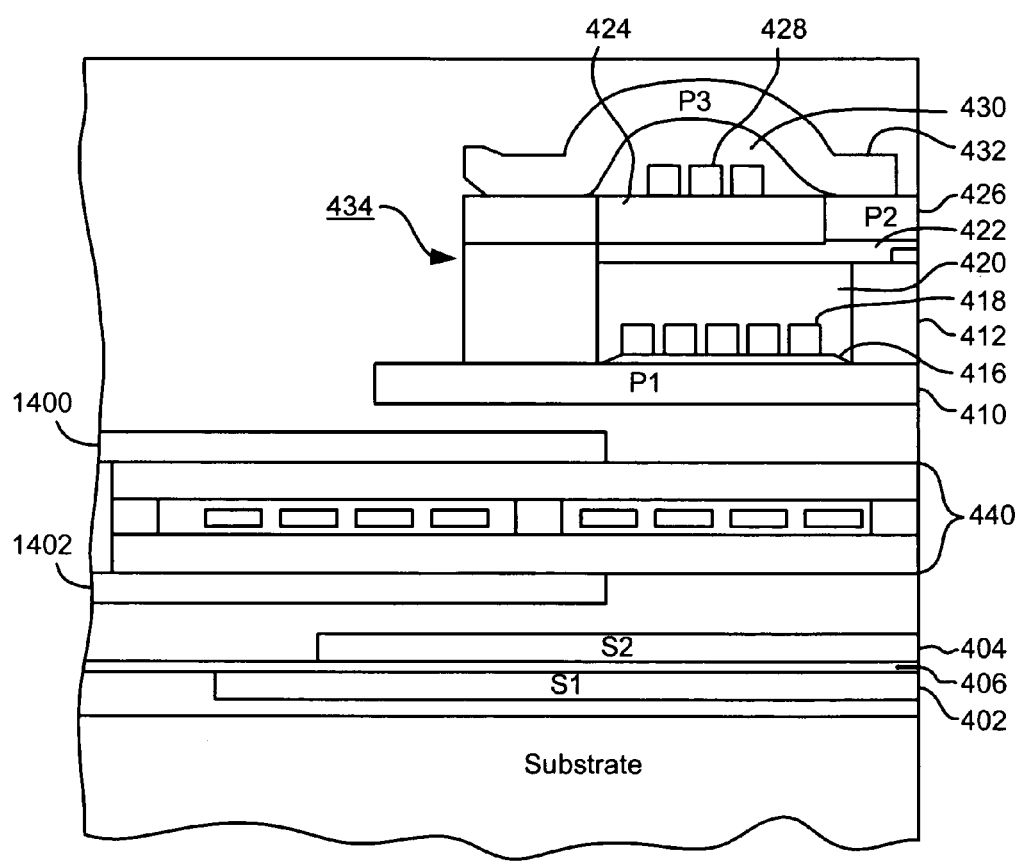
FIG. 14 is a partial cross sectional view of a head in which layers of low Young's modulus material are positioned about the toroid.

FIG. 14 illustrates a variation in which the toroid 440 is positioned between the reader and writer, with layers 1400, 1402 of low Young's modulus material being positioned towards the rear of the toroid 440 and extending towards the rear of the slider. This causes the toroid 440 to expand primarily towards the ABS, carrying the reader and writer towards and away from the ABS.

Another concern is thermal expansion of the materials caused by the increased ambient temperature in the drive during use. As the temperature in the head changes, the protrusion of each individual layer in the head due to thermal effects will vary. Particularly, the high magnetostrictive material of the toroid will have typically have a higher coefficient of thermal expansion than the surrounding materials, causing it to expand more under high heat conditions. Because it may be desirable to closely control the protrusion using primarily the magnetomechanical properties of the toroid, protrusion from thermal effects can be reduced.

Figure 15:
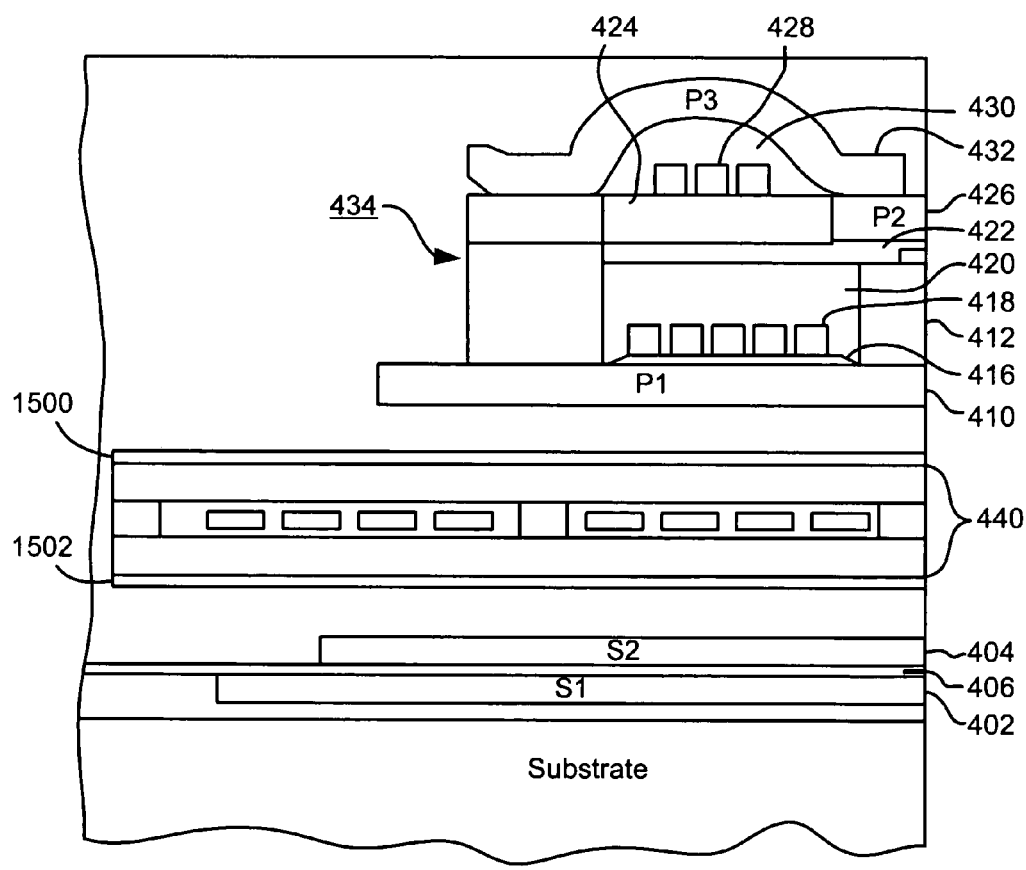
FIG. 15 is a partial cross sectional view of a head in which layers of low thermal expansion material are positioned about the toroid.

As shown in FIG. 15, to reduce the effects of thermal expansion about the toroid 440, one or more layers 1500, 1502 of low thermal expansion material is positioned between the toroid 440 and the head structure or between the toroid 440 and each of the layers 1500, 1502 of low Young's modulus material. The desired effect is to create a matching of the coefficients of thermal expansion of the materials surrounding the toroid 440. For instance, if the toroid is constructed of CoFe, layers of $SiO_2$ can be added above and below the toroid. Assuming the coefficient of thermal expansion of $SiO_2$ is about 2, and the coefficient of thermal expansion of CoFe is about 10, and the coefficient of thermal expansion of the material surrounding the toroid (e.g., substrate) is aluminum titanium carbide having a coefficient of thermal expansion of about 6, then the $SiO_2$ would be added to a thickness to create a net coefficient of thermal expansion of the $SiO_2$/CoFe layers of about 6 to match the coefficient of thermal expansion of the material surrounding the toroid. This causes the protrusion of the head to be relatively independent of thermal effects. Note that $SiO_2$ would then also preferably surround the coils in the toroid.

Figure 16:
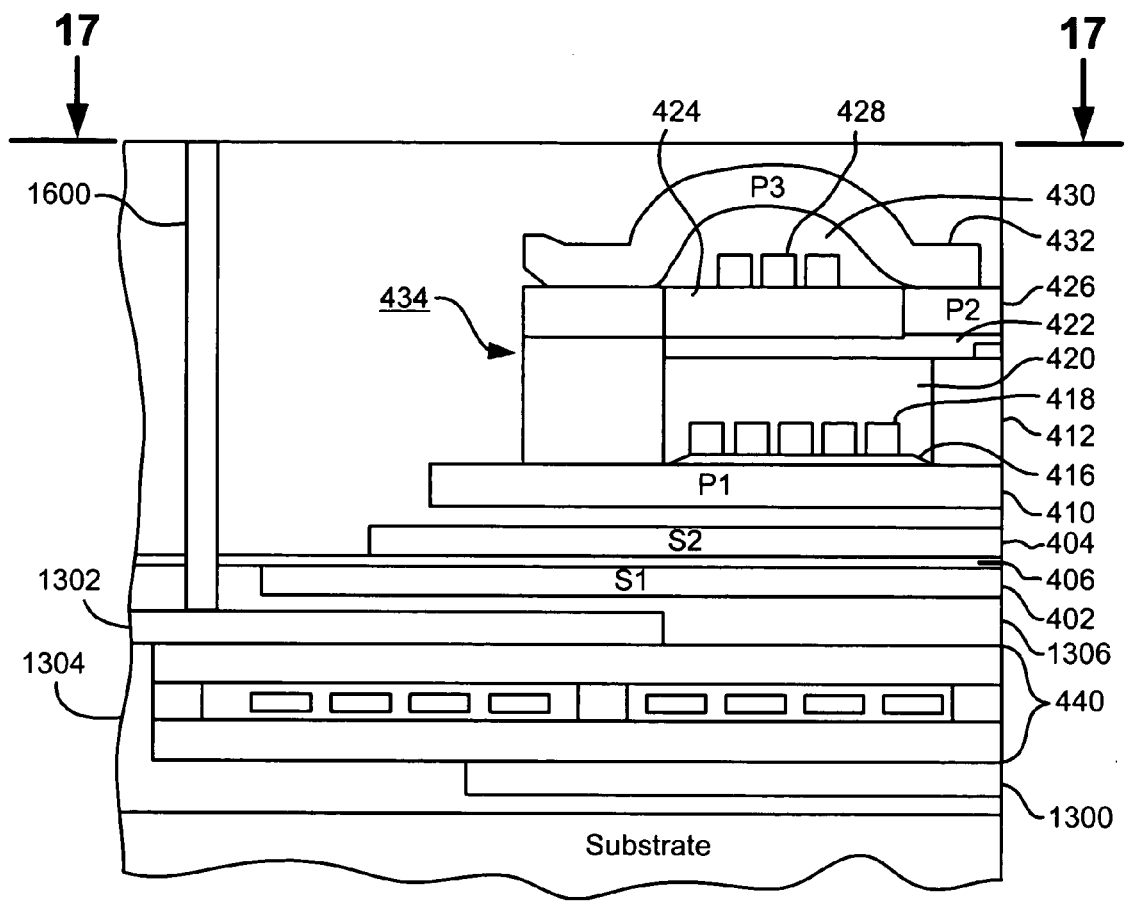
FIG. 16 is a partial cross sectional view of a head in which a layers of low Young's modulus material is positioned about the reader and writer.
Figure 17:
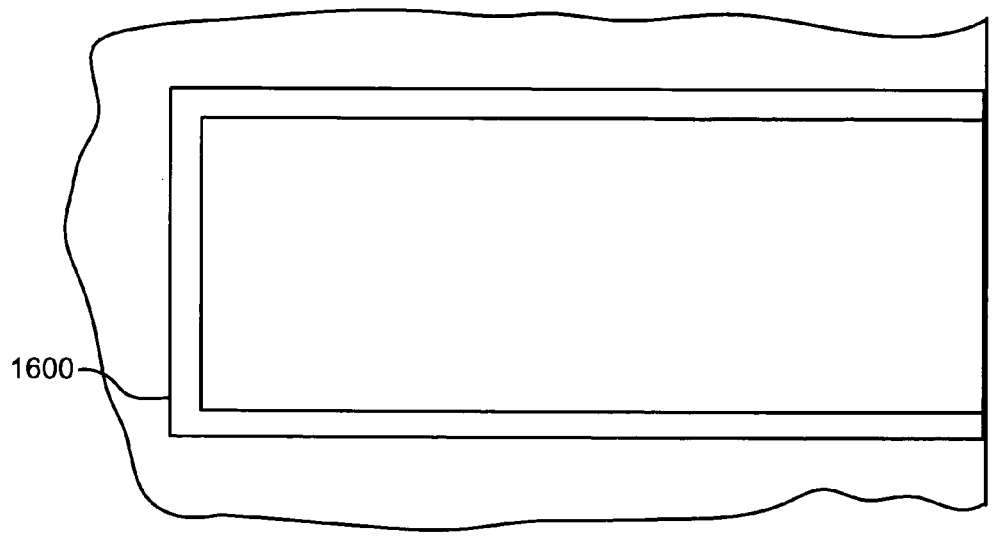
FIG. 17 is a partial deposited end view of the structure of FIG. 16 taken along line 17—17 of FIG. 16.

FIG. 16 illustrates a structure similar to that of FIG. 13, but now including a layer 1600 of low Young's modulus material or a void behind and (optionally) along the sides of the reader and writer. FIG. 17 is a deposited end view of the structure of FIG. 16. The U-shaped structure 1600 allows the toroid 440 to more easily push the head into the ABS since the head is less constricted by the surrounding materials.

Figure 18:
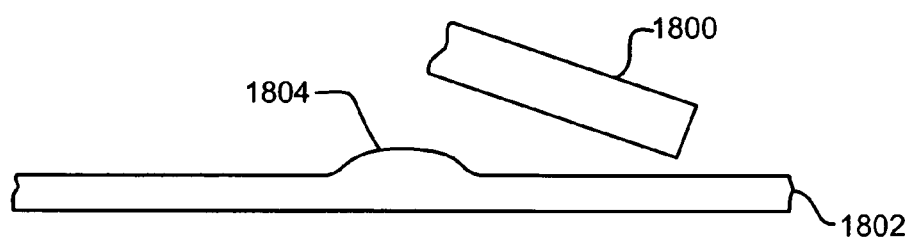
FIG. 18 is a side view illustrating a slider flying over a disk having an asperity.

FIG. 18 illustrates a slider 1800 (carrying a head) in relation to a disk 1802, the disk surface having a thermal asperity 1804. If the slider 1800 is flying near the disk surface and encounters a thermal asperity 1804 on the disk surface, the head will typically hit the asperity 1804. Such contact can cause problems with reliability. Because the present invention allows very fast controlled contraction of the ABS of the head, contact with thermal asperities can be reduced. A thermal asperity detector (integrated into the control unit 329 shown in FIG. 3 or as a separate circuit) is used to sense a change in temperature using the GMR signal, indicating that the head is approaching an asperity 1804. The asperity 1804 absorbs heat from the head, lowering the temperature of the head. The asperity detector senses the temperature reduction and causes the toroid to constrict, increasing the distance between the ABS and the disk surface so that the head avoids the asperity 1804. For example, assuming that the disk is rotating so that the velocity of the disk relative to the head is about 20 m/s, the effective contraction time of the toroid is 10 ns, and the toroid is effective to contract the ABS by 6 nm, asperities of about 0.2 µm can be easily avoided.

In summary, the new structures presented herein provide the following advantages:

Protrusion and contraction are very fast. Can magnetize the toroid in a very short time period, on the order of 1–10 nanoseconds (ns). While the magnetization can be switched very fast, the protrusion adjustment is limited only by the speed of sound of the head materials. In other words, while the magnetic switching time is very fast, the expansion of the toroid is slower, on the order of about 10–100 ns. As mentioned above, thermal protrusion occurs in about 200 µs. This is equivalent to 200,000 ns. Thus, the structure proposed herein provides a significant time advantage, about 2,000 times faster than thermal protrusion.

Because a high permeability material is used, its magnetization switches very easily. Thus, very low currents are required to switch the magnetization. The current required is typically about 1–10 mA for a copper coil with a resistance of about 10 Ω, and CoFe material forming the toroid. $CO_{50}Fe_{50}$ is preferred due to its high magnetostriction and high permeability.

The magnetic field does not leak to the other portions of the head nor to the disk, as the field is confined to the toroid.

Can induce both expansion and contraction.

Allows avoidance of asperities on the disk surface.

Functional with merged and piggyback head designs.

Functional with perpendicular recording systems.

While various embodiments have been described above, it should be understood that they have been presented by way of example only, and not limitation. For example, the magnetomechanically active structure (e.g., torroid) described herein can be used in conjunction with any type of head design, including merged and "piggyback" head designs, perpendicular recording systems, tape system heads, etc. Thus, the breadth and scope of a preferred embodiment should not be limited by any of the above-described exemplary embodiments, but should be defined only in accordance with the following claims and their equivalents.

What is claimed is:

1. A magnetic head having an air bearing surface (ABS), comprising:
   a magnetomechanically active structure; and
   a coil coupled to the magnetomechanically active structure, the magnetomechanically active structure responding to a magnetic field generated by the coil to expand and/or contract.

2. A magnetic head as recited in claim 1 wherein the magnetomechanically active structure is generally toroid shaped.

3. A magnetic head as recited in claim 1, wherein the magnetomechanically active structure includes at least two layers.

4. A magnetic head as recited in claim 3, further comprising a layer of material on an opposite side of at least one of a read element and a write element the respect to the ABS, the layer of material having a Young's modulus lower than a majority of materials surrounding the layer of material.

5. A magnetic head as recited in claim 4, further comprising second and third layers of material extending from the layer of material towards the ABS, the second and third layers of material having a Young's modulus lower than a majority of materials surrounding the second and third layers of material.

6. A magnetic head as recited in claim 1, wherein a magnetization of the magnetomechanically active structure is set parallel to the ABS, the magnetomechanically active structure inducing protrusion of the head into the ABS in response to the magnetic field generated by the coil.

7. A magnetic head as recited in claim 1, wherein a magnetization of the magnetomechanically active structure is set at an angle between about 0 and about 90 degrees with respect to the ABS, the magnetomechanically active structure inducing protrusion of the head towards the ABS in response to the magnetic field generated by the coil when current is passed through the coil in a first direction, the magnetomechanically active structure inducing contraction of the head away from the ABS in response to the magnetic field generated by the coil when current is passed through the coil in a second direction opposite the first direction.

8. A magnetic head as recited in claim 7, wherein a magnetization of the magnetomechanically active structure is set at an angle between about 30 and about 60 degrees with respect to the ABS, the magnetomechanically active structure inducing protrusion of the head towards the ABS in response to the magnetic field generated by the coil when current is passed through the coil in a first direction, the magnetomechanically active structure inducing contraction of the head away from the ABS in response to the magnetic field generated by the coil when current is passed through the coil in a second direction opposite the first direction.

9. A magnetic head as recited in claim 1, wherein a portion of the magnetomechanically active structure positioned away from the ABS is anchored.

10. A magnetic head as recited in claim 9, further comprising a first material for anchoring the portion of the magnetemechanically active structure positioned away from the ABS, and a second material coupled to the magnetomechanically active structure at a position towards the ABS, the second material having a lower Young's modulus than the first material.

11. A magnetic head as recited in claim 10, further comprising a third material positioned between the magnetomechanically active structure and the second material, the third material having a coefficient of thermal expansion similar to that of the second material.

12. A magnetic head as recited in claim 9, further comprising a first material for anchoring the portion of the magnetomechanically active structure positioned away from the ABS, and a second material coupled to the magnetomechanically active structure away from the ABS, the second material having a lower Young's modulus than the first material.

13. A magnetic head as recited in claim 10, further comprising a third material positioned between the magnetomechanically active structure and the second material, the third material having a coefficient of thermal expansion similar to that of the second material.

14. A magnetic head as recited in claim 1, further comprising a layer of material coupled to the magnetomechanically active structure, the third material having a coefficient of thermal expansion similar to that of a material of the head operatively coupled thereto.

15. A magnetic head as recited in claim 1, wherein the magnetomechanically active structure is positioned between a read element and a write element of the head.

16. A magnetic head as recited in claim 1, wherein the magnetomechanically active structure is positioned on an opposite side of a read element of the head with respect to a write element of the head.

17. A magnetic head as recited in claim 1, wherein the magnetomechanically active structure is positioned on an opposite side of a write element of the head with respect to a read element of the head.

18. A magnetic head as recited in claim 1, wherein the magnetomechanically active structure is cable of contracting upon detection of a thermal asperity on the disk surface by an asperity detector.

19. A slider having a magnetic head, the magnetic bead having an air beating surface (ABS), the slider comprising:
   a magnetomechanically active structure; and
   a coil coupled to the magnetomechanically active structure, the magnetomechanically active structure responding to a magnetic field generated by the coil to expand and/or contract.

20. A magnetic storage system, comprising:
   magnetic media;
   at least one head for reading from and writing to the magnetic media, each head comprising:
      a magnetomechanically active structure; and
      a coil coupled to the magnetomechanically active structure, the magnetomechanically active structure responding to a magnetic field generated by the coil to expand and/or contract;
   a slider for supporting the head; and
   a control unit coupled to the head for controlling operation of the head.

21. A magnetic storage system as recited in claim 20, further comprising a thermal asperity detector coupled to the at least one head, wherein the magnetomechanically active structure of the head contracts upon detection of a thermal asperity on the disk surface.

* * * * *

UNITED STATES PATENT AND TRADEMARK OFFICE
CERTIFICATE OF CORRECTION

PATENT NO. : 7,154,696 B2
APPLICATION NO. : 10/777522
DATED : December 26, 2006
INVENTOR(S) : Nikitin et al.

It is certified that error appears in the above-identified patent and that said Letters Patent is hereby corrected as shown below:

In claim 10, column 11, line 58, please replace "magnetemechanically" with --magnetomechanically--.

In claim 18, column 12, line 34, please replace "is cable of contracting" with --contracts--.

In claim 19, column 12, line 38, please replace "beating" with --bearing--.

Signed and Sealed this

Twenty-seventh Day of July, 2010

David J. Kappos
*Director of the United States Patent and Trademark Office*